(12) United States Patent
Müller et al.

(10) Patent No.: US 9,441,742 B2
(45) Date of Patent: Sep. 13, 2016

(54) MEMBRANE VALVE

(71) Applicant: GEMÜ Gebr. Müller Apparatebau GmbH & Co. Kommanditgesellschaft, Ingelfingen (DE)

(72) Inventors: Fritz Müller, Ingelfingen (DE); Raphael Flaig, Muri (CH)

(73) Assignee: GEMÜ Gebr. Müller Apparatebau GmbH & Co. Kommanditgesellschaft, Ingelfingen (DE)

( * ) Notice: Subject to any disclaimer, the term of this patent is extended or adjusted under 35 U.S.C. 154(b) by 0 days.

(21) Appl. No.: 14/648,763

(22) PCT Filed: Oct. 30, 2013

(86) PCT No.: PCT/EP2013/072665
§ 371 (c)(1),
(2) Date: Jun. 1, 2015

(87) PCT Pub. No.: WO2014/086534
PCT Pub. Date: Jun. 12, 2014

(65) Prior Publication Data
US 2015/0330518 A1  Nov. 19, 2015

(30) Foreign Application Priority Data
Dec. 3, 2012  (DE) .......................... 10 2012 222 062

(51) Int. Cl.
*F16K 7/12*  (2006.01)
*F16K 27/02*  (2006.01)

(52) U.S. Cl.
CPC ........... *F16K 7/126* (2013.01); *F16K 27/0236* (2013.01)

(58) Field of Classification Search
CPC .......... F16K 7/126; F16K 7/123; F16K 7/12; F16K 27/0236

USPC .............................................. 251/331, 335.2
See application file for complete search history.

(56) References Cited

U.S. PATENT DOCUMENTS 2,710,629 A * 6/1955 Price ...................... F16K 7/126
                                                        251/331
3,154,286 A * 10/1964 McFarland, Jr. ....... F16K 7/126
                                                        251/331

(Continued)

FOREIGN PATENT DOCUMENTS

DE            81760 A1    5/1971
DE     202005002152 U1    6/2006

(Continued)

OTHER PUBLICATIONS

Examination Report issued in German Patent Application No. 10 2012 222 062.3 dated Nov. 13, 2013.

(Continued)

*Primary Examiner* — John Bastianelli
(74) *Attorney, Agent, or Firm* — Howard & Howard Attorneys PLLC

(57) ABSTRACT

A membrane valve for fluid media, comprising a valve body, a membrane, a pressure piece, and a drive) for the pressure piece. The membrane is coupled to the pressure piece by a connecting element, having a wall which projects from the membrane in the direction of the pressure piece. A latching hook laterally protrudes from one side and a free space is provided on the other side such that the wall. The latch hook can be deflected in order to connect the latching hook to a corresponding receiving portion on the pressure piece. A stationary pin engages into the free space when the membrane is raised from the valve seat of the valve body and protrudes out of the free space when the membrane is resting on the valve seat.

10 Claims, 3 Drawing Sheets

(56) References Cited

U.S. PATENT DOCUMENTS

| | | | | |
|---|---|---|---|---|
| 3,631,882 | A * | 1/1972 | White, Jr. | F16K 7/126 251/331 |
| 6,508,266 | B2 * | 1/2003 | Iritani | F16K 7/126 251/331 |
| 6,834,675 | B1 * | 12/2004 | Gill | F16K 7/12 251/287 |
| 7,614,606 | B2 * | 11/2009 | Muller | F16K 7/12 251/331 |
| 7,634,962 | B2 * | 12/2009 | Muller | F16K 7/12 92/103 F |
| 2006/0174949 | A1 | 8/2006 | Muller | |
| 2011/0031427 | A1 * | 2/2011 | Sitnikov | F16K 7/126 251/335.2 |
| 2012/0097880 | A1 | 4/2012 | Boettcher et al. | |
| 2014/0158923 | A1 | 6/2014 | Wolpert et al. | |
| 2014/0166918 | A1 | 6/2014 | Kropf et al. | |

FOREIGN PATENT DOCUMENTS

| | | |
|---|---|---|
| EP | 0795707 A1 | 9/1997 |
| WO | 2010/025905 A1 | 3/2010 |
| WO | 2013/017354 A1 | 2/2013 |

OTHER PUBLICATIONS

International Search Report and Written Opinion of the International Searching Authority issued in PCT International Application No. PCT/EP2013/072665 mailed Jan. 16, 2014.

* cited by examiner

MEMBRANE VALVE

CROSS-REFERENCE TO RELATED APPLICATIONS

The present application is a National Stage of International Patent Application No. PCT/EP2013/072665, filed on Oct. 30, 2013, which claims priority to and all the benefits of German Patent Application No. 10 2012 222 062.3, filed on Dec. 3, 2012, both of which are hereby expressly incorporated herein by reference in their entirety.

BACKGROUND OF THE INVENTION

1. Field of the Invention

The invention relates to a membrane valve, particularly for fluid media, having a valve body, a membrane, a pressure piece and a drive for the pressure piece, wherein the membrane is coupled to the pressure piece by of a connecting element, wherein the connecting element comprises a wall projecting from the membrane in the direction of the pressure piece, wherein a laterally projecting latch hook is provided on one side of the wall and on the other side is provided a free space, so that the wall can get out of the way for connecting the latch hook with a corresponding receptacle.

2. Description of the Related Art

There are known membrane valves that have a valve body having an inflow and an outflow (DE 20 2005 002 152 U1). Furthermore, the valve bodies comprise a valve seat sealable by a membrane, wherein the membrane is connected by a connecting element with a pressure piece of a drive. The known membranes can be made in one or two layers. From WO 2010/025 905 A1 is known a single-layer membrane, which may also be formed integrally with the connecting element or on which can be formed the connecting element. The membrane is made of the same plastic material as the valve body, namely of polyethylene (PE). In addition, the valve body and the membrane are connected fixedly to each other by ultrasonic welding in a fluid-tight valve body unit which can be coupled with the drive.

Due to the fixed connection of the valve body, the membrane and the connecting element to a sealed valve body unit, it is possible to form the valve body unit as a disposable unit, and to integrate the membrane valve into a disposable hose system or pre-sterilizable pharmaceutical system. The valve body unit can therefore be formed in a cost-effective way as a disposable or single-use valve body unit and be coupled to a reusable drive or connected to it. The firm connection of the membrane and the valve body seals the valve body unit during the transport phase. This avoids contamination of the valve chamber or the environment.

Due to the firm connection of the connecting elements with the membrane, the membrane can not only be pushed into its closed position but also pulled into its open position, so that the valve chamber in the valve body can be designed to be relatively large in volume and thereby, for example, a sufficiently large volume flow can be achieved for the tube systems of filtration equipment. However, it has turned out that the achievable lift between the closed and open positions is limited, because otherwise the coupling of the pressure piece and the connecting element is unintentionally released as the connecting element disengages due to too high pressure.

SUMMARY OF THE INVENTION

The invention is therefore based on the technical task to provide a membrane valve in which the membrane can perform a greater lift without the risk that the connecting element and thus the membrane decouples from the pressure piece.

This technical task is solved in a membrane valve of present invention, in that a fixed pin is provided which, with the valve seat of the valve body lifted off the membrane, engages into the free space behind the wall and, particularly in the case of the membrane resting on the valve seat, protrudes from the free space.

In the membrane valve according to the invention, the membrane is connected by a latch hook to the pressure piece, so that the coupling easily occurs in that the connecting element is snapped together with the membrane on the pressure piece. When closing the membrane valve, this type of connection does not pose any danger. If the membrane valve is opened, the membrane of the pressure piece is lifted by the connecting element from the valve seat by applying a pull to the connecting element. However, a simple snap-in connection can be released unintentionally. In the inventive solution, this is prevented in that the wall which carries the latch hook cannot get out of the way because of the pin that is present in the free space, and thus the latch hook cannot come out of its seat in the receptacle. This allows much higher tensile forces to be exerted on the connecting element and the membrane to be removed from the valve seat.

One embodiment of the invention provides that the connection element is formed cup-shaped and the opening is in the direction of the pressure piece. Thereby, the forces acting on the connecting element can be easily distributed over the circumference. The connecting element is designed in the manner of a hollow locking pin.

In a further development of the membrane valve according to the invention, the cup-shaped connecting element comprises a circular cylindrical pin, wherein on its outer circumference is or are arranged the latch hook(s). Advantageously, the pressure piece is surrounded by a fixed sleeve in which the pressure piece can be moved. The sleeve thus forms a sliding sleeve for the pressure piece.

In one embodiment, a transverse pin is mounted in the sleeve. This transverse pin is stationary as the sleeve itself. For receiving the transverse pin, the pressure piece comprises a breakthrough transverse to its direction of movement, which is penetrated by the transverse pin. In addition, the stationary pin is mounted on the transverse bolt. The stationary pin in turn passes through the pressure piece in its direction of movement and in the direction of the membrane. In this way, inside the displaceable pressure piece is a stationary element, which cooperates with the cup-shaped connecting element and in particular engages in it.

The free end of the fixed pin is formed in such a manner that, with the membrane lifted from the valve, it engages in the cup-shaped connecting element and bears against the inner surface of the wall. In this way, a shift of the wall is prevented so that the latch hook does not disengage from the receiving recess even under high tensile forces. With the membrane resting on the valve seat, only when the free end of the fixed pin emerges from the cup-shaped connecting element, the connecting element and thus the membrane can be decoupled from the pressure piece and, for example, exchanged.

BRIEF DESCRIPTION OF THE DRAWINGS

Further advantages, features and details of the invention become clear from the dependent claims and the following description in which one embodiment is described in detail with reference to the drawing, wherein:

DETAILED DESCRIPTION OF THE INVENTION

Figure 1:
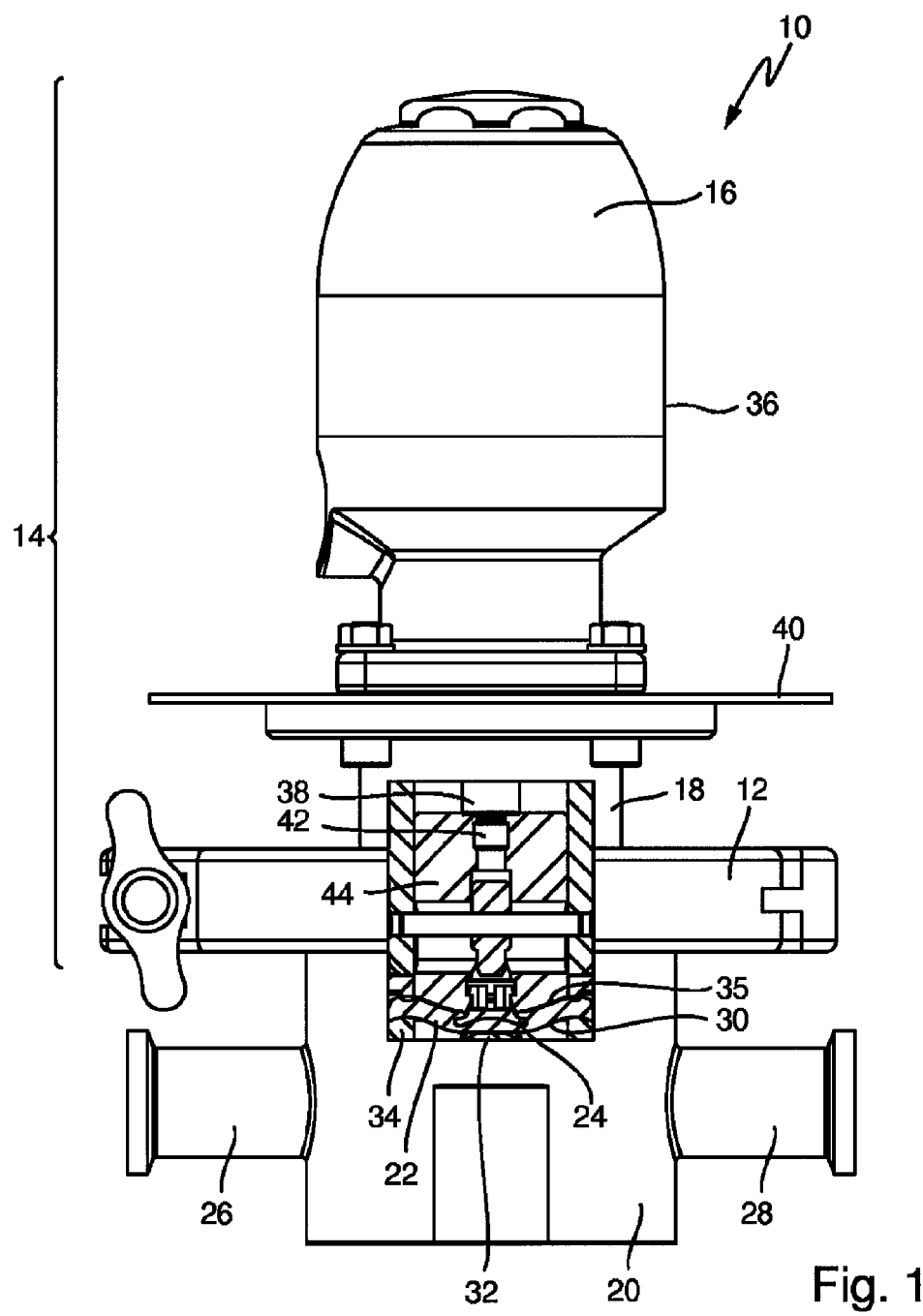
FIG. 1 is a side view of a membrane valve with a drive, partially cut open.

FIG. 1 shows a membrane valve generally indicated at 10 in which a valve body 20 is attached to a drive 14 by a clamp 12. The drive 14 may include an electrically, hydraulically or pneumatically operated drive unit 16 and an adapter 18. The valve body 20 is equipped with a membrane 22 with a connecting element 24, which is shown in FIGS. 2-5 in detail. The valve body 20 has an inflow 26 and an outflow 28, which opens into the valve chamber 30 limited between the valve body 20 and the membrane 22, wherein the connection between the inflow 26 and the outflow 28 is interrupted by pressing the membrane 22 against a valve seat 32.

The membrane 22 is supported on a projecting shoulder 34 of the valve body 20 which protrudes over the valve seat 32 and seals the valve body 20 relative to the drive 14 and the environment. In the embodiment illustrated herein, the valve body 20 is formed of polypropylene (PP), and the membrane 22 of a thermoplastic elastomer (TPE). Other materials and material combinations are possible and the invention is not limited to the aforementioned materials.

On its back side 35 facing away from the valve body 20, the connecting element 24 is coaxially connected with the membrane 22 and project from the membrane 22, in particular integrated by a 2-K injection molding process, having a greater width than the valve seat 32. With the membrane valve 10 closed, the membrane 22 is formed convexly toward the valve seat 32, wherein the corresponding valve seat 32 is also formed convexly toward the membrane 22. The membrane 22 and the valve body 20 are connected to each other liquid-tight and gas-tight, in particular by ultrasonic welding, in the region of the shoulder 34.

The drive unit 16 has a substantially cup-shaped housing 36 with an adjusting spindle 38 movable in its longitudinal direction. The housing 36 can be put in a known manner from the inside, for example, on a control cabinet plate 40 and fastened from the outside by the adapter 18. On the free end 42 of the adjusting spindle 38 is screwed a pressure piece 44, whose free end in turn can be latched and unlatched with the connecting element 24.

Figure 2:
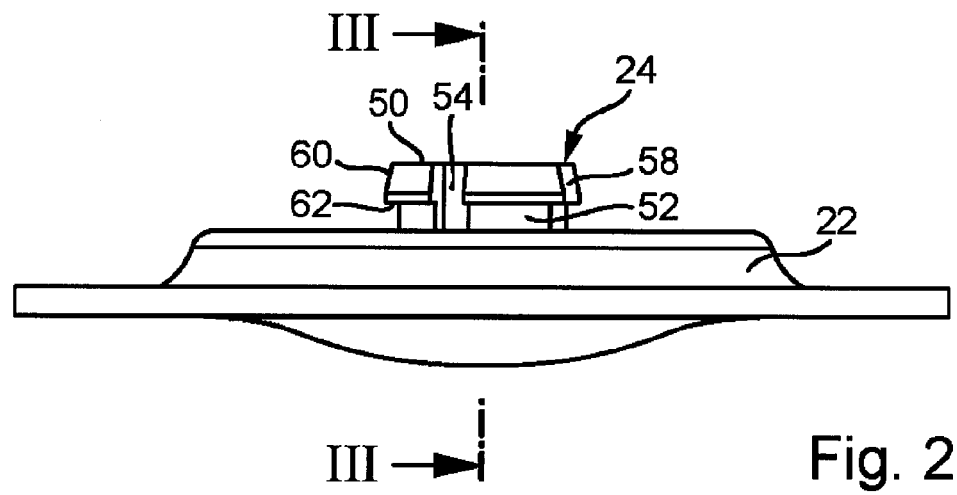
FIG. 2 illustrates the membrane with an integrated connecting element in side view.
Figure 3:
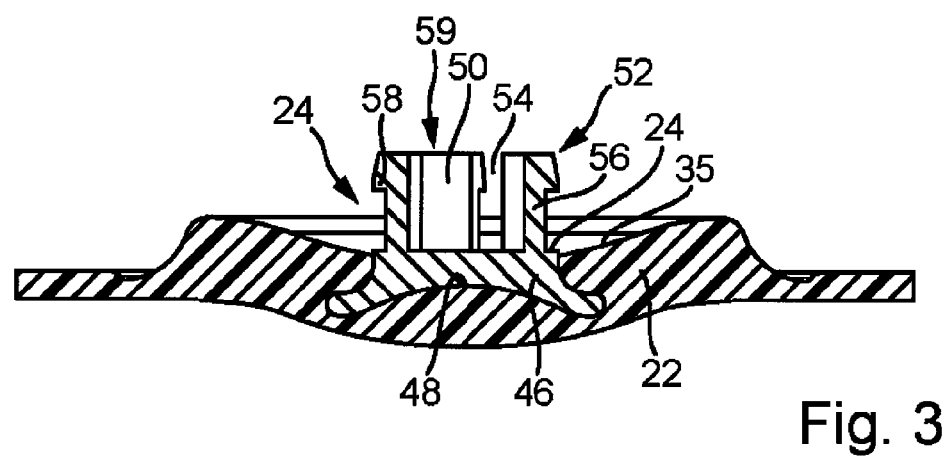
FIG. 3 illustrates the membrane of FIG. 2 in cross-section.

FIGS. 2 and 3 show the membrane 22 with integrated connecting element 24. It can be clearly seen that the connecting element 24 is formed with a first section 46 in a mushroom-shape and a concave free end 48. The concave end 48 is mounted in the cone-like manner in the convex section of the membrane 22 so that in the membrane 22 is formed a lenticular material accumulation in the area of the concave end 48 of the connecting element 24. This achieves an optimal power transmission by the connecting element 24 to the membrane 22, especially when opening the membrane valve 10, i.e. when lifting the membrane 22 from the valve seat 32. The concave end 48 of the connecting element 24 has an encircling peripheral edge, semi-circular in cross-section, so that notch effects in the material of the membrane 22 are avoided.

The second region 50 of the connecting element 24 facing away from the membrane 22 is formed cup-shaped and as a locking pin 52 which serves for fastening the connecting element 24 on the pressure piece 44. For this purpose, the locking pin 52 comprises axial slots 54, whereby a total of three walls or fingers 56 are formed, which are provided at their free ends with locking lugs 58 which project radially outward. In addition, the locking pin 52 is formed hollow as a hollow pin 59. The locking lugs 58 have a distal insertion bevel 60 and a proximal shoulder 62 for locking in the pressure piece 44. The pressure piece has a receiving bore 63 (FIG. 5), into which the locking lugs 58 enter when the membrane valve 10 is closed for the first time and snap into the provided undercuts. The force required for engagement is low due to the relatively elastic finger 56 and the inlet slopes 60. However, the pull-off force is high because the shoulders 62 optimally anchor the locking pins 52 in the pressure piece 44.

Figure 4:
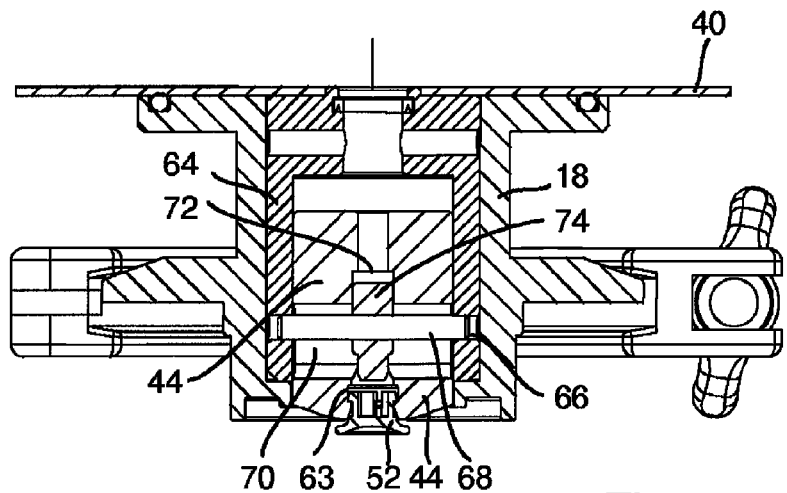
FIG. 4 is an enlarged illustration of the pressure piece with attached membrane with the membrane valve closed.

FIG. 4 shows the locking pin 52 locked in the pressure piece 44, whereby the membrane valve 10 is in its closed position, i.e. the pressure piece 44 is extended so that the membrane 22 rests on the valve seat 32.

Furthermore, it is apparent that a sliding sleeve 64 is arranged in the adapter 18, which sleeve is located coaxially to the axis of the pressure piece 44 in which the pressure member 44 is displaceable. This sliding sleeve 64 is provided with a transverse bore 66 in which a cross-bolt 68 is mounted. This cross-bolt 68 also passes through the pressure piece 44 in its breakthrough 70 extending transverse to its direction. Finally, in the pressure piece 44 is provided a coaxial bore 72, in which is mounted a sliding pin 74, whereby the pin 74 is also penetrated by the cross-bolt 68. The sliding sleeve 64, the cross-bolt 68 mounted therein and the pin 74 mounted on the cross-bolt 68 are stationary relative to the pressure piece 44, i.e. they do not perform the displacement movements of the pressure piece 44. This has the result that during the opening operation of the membrane valve 10, in which the membrane 22 is lifted from the pressure piece 44, the pin 74 remains above the locking pin 52 and the locking pin 52 comes closer to the pin 74 and finally the pin 74 engages in the cup-shaped locking pin 52.

Figure 5:
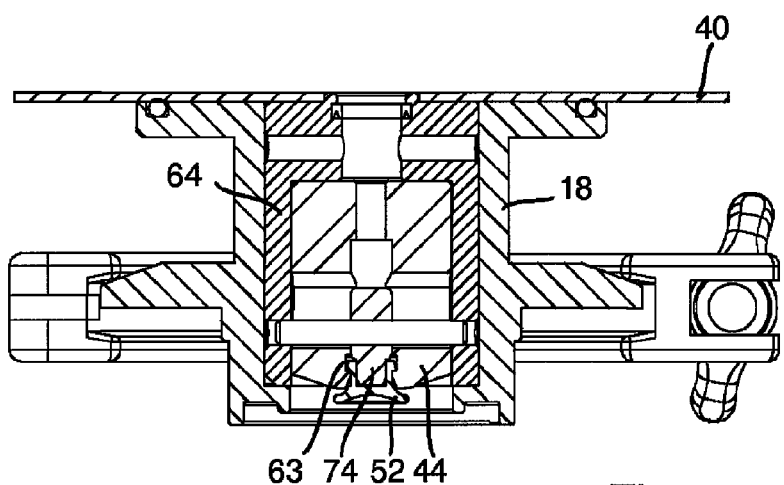
FIG. 5 is an enlarged illustration of the pressure piece with attached membrane with the membrane valve open.

This position of the locking pin 52, which it occupies in the open position of the membrane valve 10 is shown in FIG. 5. The sliding movement of the pressure piece 44 and the coupled locking pin 52 is not impeded. Since to open the membrane valve 10, tensile forces are exerted by the pressure piece 44 on the locking pin 52, normally, there is the danger that the locking pin 52 disengages from the pressure piece 44 in that the walls or fingers 56 bend radially inward and the shoulders 62 of the locking lugs 58 come free from the undercuts in the pressure piece 44. This is prevented in the invention by the pin 74 engaging with the locking pin 52, because now the finger 56 can no longer move away. The locking pin 52 is secured to the pressure piece 44.

The engagement of the pin 74 starts from a lift height of 1.8 mm. Since the pin 74 at the extended pressure piece 44 does not engage the locking pins 52, a change of the membrane 22 is no problem, because the walls or fingers 56, the fingers 56 can be freely disengaged from undercuts in the pressure piece 44 bent radially inward and. It can be transmitted to the membrane 22 so much higher tensile forces.

The engagement of the pin 74 starts from a lift height of approximately 1.8 mm. Since with the extended pressure piece 44 the pin 74 does not engage in the locking pin 52, an exchange of the membrane 22 is no problem, because the walls or fingers 56 are bent radially inward and the fingers

56 can be freely disengaged from the undercuts in the pressure piece 44. There can thus be transmitted so much higher tensile forces to the membrane 22. Another advantage is seen in the fact that, since in the adapter 18 (or the spacer) the sliding sleeve 64 is used as a separate component, the membrane valve 10 can be easily mounted. Furthermore, the sliding sleeve 64 serves for exact and frictionless guiding of the pressure piece 44. A locking of the locking pin 52 is thus guaranteed even with a slanting membrane valve 10 with deviations at which the locking pin 52 may also lie eccentrically or the locking pin 52 is slightly out of round.

The valve body 20 can be used as a single-use valve body unit, for example in sterile pharmaceutical clean rooms or in the food industry. As a reusable valve body 20, it may be used in any conceivable area in which plastic valves can also be used.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A membrane valve for fluid media, having a valve body, a membrane, a pressure piece and a drive for the pressure piece, wherein the membrane is coupled to the pressure piece by a connecting element, wherein the connecting element includes a wall projecting from the membrane in the direction of the pressure piece, said wall including a locking lug projecting laterally from one side of said wall and a free space disposed on the other side of said wall, so that the wall can get out of the way for connecting the locking lug with a corresponding receptacle on the pressure piece, wherein a fixed pin protrudes into the free space when the membrane is lifted off a valve seat of the valve body and, leaves the free space when the membrane rests on the seat.

2. The membrane valve as set forth in claim 1, wherein the connecting element is cup-shaped and the opening points in the direction of the pressure piece.

3. The membrane valve as set forth in claim 2, wherein the cup-shaped connecting element comprises a cylindrical section having an outer periphery which includes the locking lug(s).

4. The membrane valve as set forth in claim 1, wherein the pressure piece is surrounded by a stationary sleeve and is movable in the sleeve.

5. The membrane valve as set forth in claim 4, wherein a cross-bolt is mounted in the sleeve.

6. The membrane valve as set forth in claim 5, wherein the pressure piece has a breakthrough extending transverse to a direction of movement of the pressure piece, which is penetrated by the cross-bolt.

7. The membrane valve as set forth in claim 5, wherein the fixed pin is mounted to the cross-bolt.

8. The membrane valve as set forth in claim 1, wherein the fixed pin passes through the pressure piece in a direction of movement of the pressure piece and in the direction of the membrane.

9. The membrane valve as set forth in claim 2, wherein the free end of the fixed pin is shaped such that, with the membrane lifted off the valve seat, the free end of the fixed pin engages in the cup-like connecting element and abuts to the inner surface of the wall.

10. The membrane valve as set forth in claim 2, wherein the free end of the fixed pin emerges from the cup-like connecting element wherein the membrane rests on the valve seat.

* * * * *